July 31, 1962   J. A. RICKARD   3,047,720
HELIUM 3 SCINTILLATION NEUTRON DETECTOR
Filed Dec. 7, 1956   2 Sheets-Sheet 1

*INVENTOR.*
JAMES A. RICKARD,
BY *John S. Schneider*
ATTORNEY.

July 31, 1962          J. A. RICKARD          3,047,720

HELIUM 3 SCINTILLATION NEUTRON DETECTOR

Filed Dec. 7, 1956          2 Sheets-Sheet 2

*INVENTOR.*
JAMES A. RICKARD,

BY *John A. Schneider*

ATTORNEY

United States Patent Office 3,047,720
Patented July 31, 1962

3,047,720
HELIUM 3 SCINTILLATION NEUTRON DETECTOR
James A. Rickard, Bellaire, Tex., assignor, by mesne assignments, to Jersey Production Research Company, Tulsa, Okla., a corporation of Delaware
Filed Dec. 7, 1956, Ser. No. 626,882
3 Claims. (Cl. 250—71.5)

This invention concerns identifying subsurface formations and the elements therein.

Knowledge of the general nature of a subsurface formation can be obtained by noting generally the effect of the formation on incident (primary) radiation. However, a much greater knowledge of the nature of the subsurface formations may be obtained by measurement of the energy of induced (secondary) particles produced by primary radiation. Certain substances, when bombarded by primary radiation, emit characteristic secondary radiation. Since the radiation from two different substances may be identical in all respects except energy, a measurement of energy is essential to determine which substances are present in the formation.

In my copending patent application, Serial No. 534,234, filed September 14, 1955, now abandoned, a method for observing radiation derived from nuclear reactions to determine the presence and amounts of substances in the subsurface formations is discussed. The method of actually observing and measuring secondary radiation vary somewhat according to the type of radiation. For example, for the detection of fast induced neutrons, various types of proportional counters and scintillation counters may be used. My copending patent application, Serial No. 626,881, filed December 7, 1956, now Patent No. 2,979,618, granted April 11, 1961, entitled "Helium 3 Logging Method," discusses the difficulty of obtaining good induced neutron energy spectra and presents a method for overcoming the difficulty. Essentially this method consists in observing the ionization produced by the reaction products hydrogen 3 ($H^3$) and proton (p), from the reaction:

$He^3$ (helium 3)$+n$ (neutron)$\rightarrow H^3+p+.770$ mev.

Neutrons of the same energy participate in two different types of reactions, the elastic scattering reaction and the neutron-proton (n, p) reaction, noted above. In the elastic scattering reaction, the ionization produced is not proportional to the energy of the incident neutron. Instead the ionization produced will vary from zero to about ¾ of that which would be produced by a charged particle having energy the same as the neutron. In the (n, p) reaction, the ionization produced is proportional to the energy of the incident neutron.

In practice it is difficult to distinguish between ionization pulses produced by the two types of reactions. With incident neutrons of one energy, the ionizations produced by each of the two reactions or processes are very different and hence readily distinguishable. However, when incident neutrons of several energies are involved, the problem is more complicated. While it is true that for any one neutron energy there is no difficulty in distinguishing between the pulses produced by the two types of reactions, it is difficult to distinguish between elastic scattering pulses produced by, for example, a 2½ mev. neutron, and the (n, p) reaction pulses produced by a 1 mev. neutron. The former reaction gives pulses varying from zero to slightly over 2 mev., while the latter reaction gives pulses of 1.77 mev. As readily seen, confusion results when an attempt is made to distinguish between the pulses produced by these two reactions. This confusion is aggravated as more neutrons of different energies are introduced into the detecting or counting system.

The apparatus described herein provides means for distinguishing ionizations resulting from elastic scattering reactions and ionizations resulting from (n, p) reactions by utilizing the fact that the elastic scattering reaction produces only one charged particle, i.e., the recoiling nucleus, whereas (n, p) reaction produces two charged particles, the triton ($H^3$) and the proton ($H^1$).

Thus, an object of this invention is to provide apparatus for obtaining good neutron energy spectra by distinguishing between ionization pulses produced by elastic scattering reaction and pulses produced by the (n, p) reaction.

It is a further object of this invention to provide apparatus for distinguishing between elastic scattering and (n, p) reactions by employing a coincidence device whereby one charged particle resulting from an elastic scattering event is not detected, but whereby the two charged particles from the (n, p) event are detected and measured in energy.

Briefly, the invention provides a scintillation detector having spaced apart photomultiplier tubes and a plurality of spaced apart scintillating means arranged between the tubes; the space between the scintillating means containing $He^3$; the scintillating means being arranged such that light generated by adjacent scintillating means enters different photompultiplier tubes; and the photomultiplier tubes being connected for coincidence counting.

The scintillating means is formed of luminescent material termed "phosphors." A charged particle in passing through a phosphor excites and ionizes the molecules of the phosphor which molecules then radiate energy in the form of light.

Referring briefly to the drawings.

Figure 1:
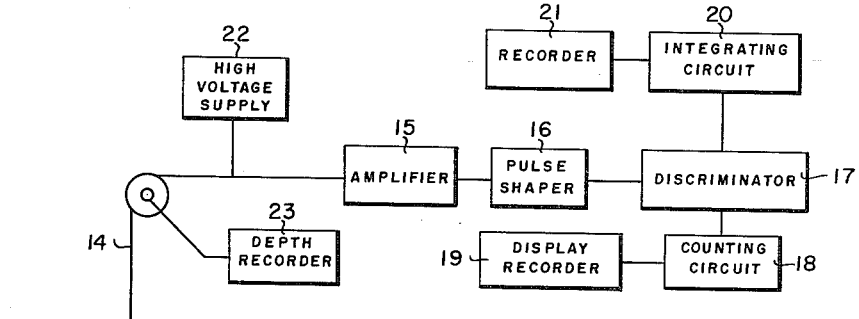
FIG. 1 is a schematic representation of the down-the-hole and surface apparatus employed with my invention.
Figure 1:
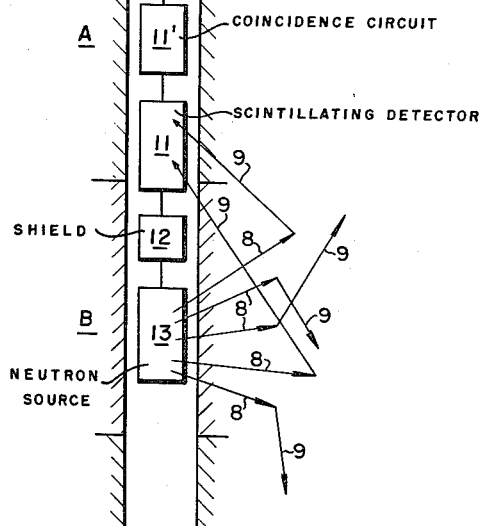

Referring to the drawings in greater particularity for a more detailed discussion of the apparatus of my invention:

In FIG. 1 is shown a borehole 10 penetrating a plurality of subsurface formations A and B. A scintillation detector 11, a coincident circuit 11', a shield 12 and a primary source of radiation 13 which may suitably be a neutron source, are positioned on an electrically conductive cable 14 which is adapted to be raised and lowered in the borehole 10. At the surface of the earth, the conductor 14 connects to an amplifier 15, a pulse shaper 16 and a discriminator 17. From the discriminator 17, the conductor cable 14 may be either connected to a counting circuit 18 and a display recorder 19, or to an integrating circuit 20 and a recorder 21 or to other suitable pulse analysis means. A high voltage supply 22 is shown connected to conductor cable 14 and, if desired, a suitable depth recorder 23 may be utilized to show the depth of the subsurface equipment at any particular time.

Figure 2:
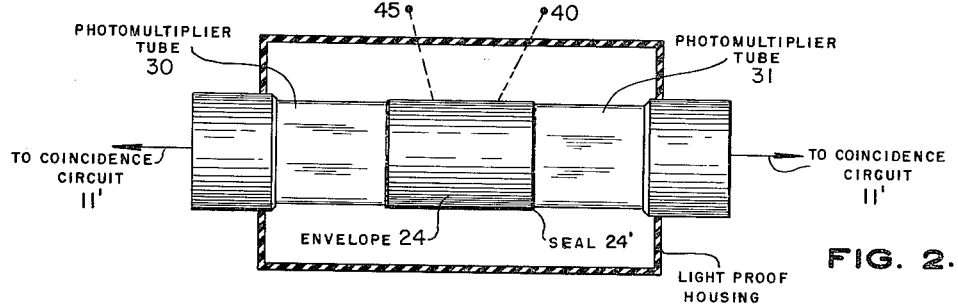
FIG. 2 is a schematic showing of the detector element.

As seen in FIG. 2, the detector 11 includes spaced apart photomultiplier tubes 30 and 31 between which is positioned an envelope 24 containing scintillation phosphor material and helium 3 gas hermetically sealed at each end as at 24'. Envelope 24 is constructed of material transparent to the induced neutrons. A housing 25, transparent to induced neutrons but not to light rays, encloses the tubes and envelope.

Figure 3:
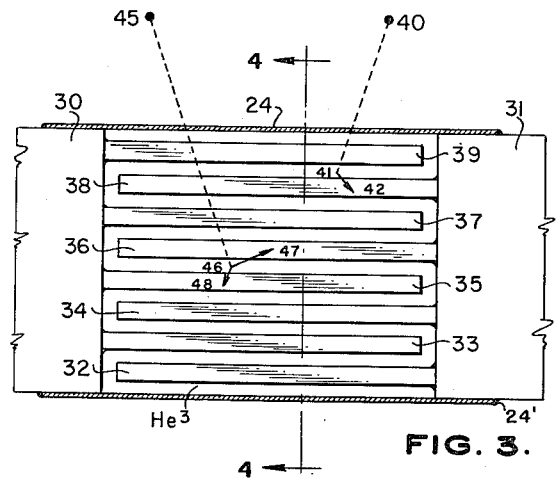
FIG. 3 is a vertical cross-sectional view of one embodiment of the arrangement of the detector.
Figure 4:
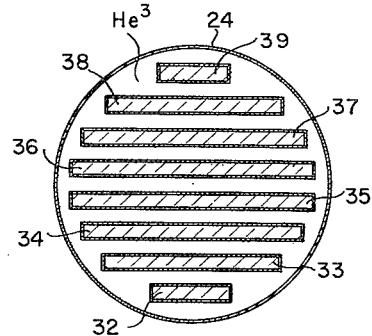
FIG. 4 is a view taken on lines 4—4 of FIG. 3.

In the embodiment of FIGS. 3 and 4, a plurality of elongate, spaced apart phosphor wafers 32 through 39 extend linearly between photomultiplier tubes 30 and 31 within the envelope 24. The space surrounding the wafers is filled with helium 3 gas. The surfaces of the wafers are coated with a reflective substance opaque to light and arranged so that light rays generated in adjacent wafers enter different photomultiplier tubes. Thus, light rays generated in wafers 32, 34, 36 and 38 can enter only tube 31 and light rays generated in wafers 33, 35, 37 and 39 can enter only tube 30.

Figure 5:
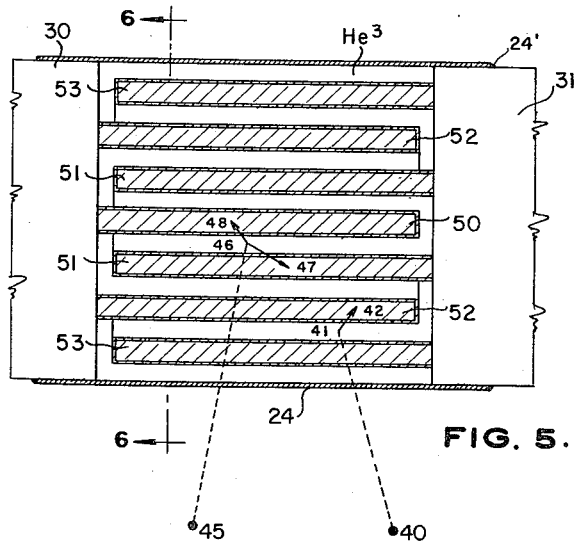
FIG. 5 is a vertical cross-sectional view of another embodiment of the arrangement of the detector.
Figure 6:
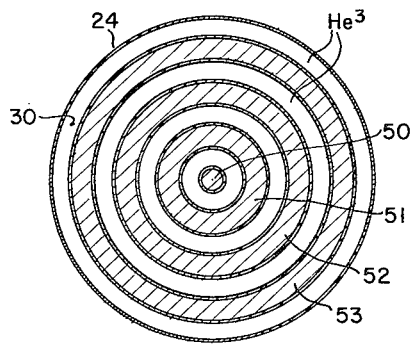
FIG. 6 is a view taken on lines 6—6 of FIG. 5.

In the embodiment of FIGS. 5 and 6, a plurality of spaced apart phosphor cylinders 50 through 53 are positioned between photomultiplier tubes 30 and 31 within envelope 24. The space between the cylinders is filled with helium 3 gas. As in the previous embodiment the surfaces of the cylinders are coated with a reflective substance opaque to light and arranged so that light rays generated in adjacent cylinders enter different photomultiplier tubes. Thus light rays generated in cylinders 50 and 52 can enter only tube 30 and light rays generated in cylinders 51 and 53 can enter only tube 31.

In operation, as seen in FIG. 1, the apparatus is lowered in the borehole and subsurface formations A and B are bombarded by primary radiation emitted from source 13 as designated by the arrowed lines 8. The induced secondary neutrons produced by nuclear reactions in the formations as designated by the arrowed lines 9 enter detector 11. As seen in FIGS. 3 and 4, an induced neutron 40 undergoes elastic scattering as at 41 in the helium-filled space between wafers 38 and 39, producing only one charged recoil particle 42. This particle 42 enters only wafer 38. On the other hand, the induced neutron 45 undergoes an (n, p) reaction, as at 46 in the helium-filled space between the wafers 35 and 36, producing two charged reaction products 47 and 48, which a part of the time at least penetrate two adjacent wafers 35 and 36. The two photomultiplier tubes 30 and 31 are connected to coincidence circuit 11'.

The operation of the coincidence circuit 11' is such that pulses from the output of the photomultiplier tubes count only when the tubes are simultaneously affected. Such circuits are known, hence a detailed description of their operation is considered unnecessary. The output of coincidence circuit is transmitted to amplifier 15, pulse shaper 16 and discriminator 17 (wherein pulses of selected amplitude are passed through). From the discriminator the pulses of selected amplitude may be transmitted to an integrating circuit 20 and recorder 21 or to a counting circuit 18 and display recorder 19.

The operation of the embodiment of FIGS. 5 and 6 is similar to the operation of the embodiment of FIGS. 3 and 4. Thus, neutron 40 undergoes elastic scattering as at 41 in the helium-filled space between cylinders 52 and 53, producing only one charged recoil particle 42 which enters only cylinder 52. However, neutron 45 undergoes (n, p) reaction as at 46 in the helium 3 filled space between cylinders 50 and 51, producing two charged reaction products 47 and 48 which penetrate the two adjacent cylinders 50 and 51. The remainder of the operation is the same as that discussed for the operation of the embodiment of FIGS. 3 and 4.

It is necessary that the wafers or cylinders be as thick as is necessary to stop completely any recoil particle or particles from elastic scattering events and $He^3$ (n, p) events. The helium-filled space between the wafers or cylinders should be of the same order of magnitude as the wafers or cylinders and should be small enough so that the secondary particles of the (n, p) reaction lose only a negligible part of their energy in the helium 3 region.

The dimensions will be somewhat dependent on the energy of the incident neutrons. For example, a 3 mev. proton travels 14 cm. in air at ntp. A 3 mev. triton ($H^3$) travels about 2 cm. in air at ntp. If the incident neutron had 5 mev. energy, and if the energy happened to be distributed equally to the secondary proton and triton, then each would have $½ \times (5.77) = 2.88$ mv. energy. The dimensions should, therefore, be relatively small compared to 2 cm. For example, the helium space may be suitably about 0.1 cm. in width and the width or thickness of the phosphor wafer or cylinder may be suitably somewhat less, for example, 0.05 cm. However, the wafer or cylinder may be as thick as 0.3 or 0.4 cm., if such thickness is required to achieve physical rigidity. The phosphor material used as the scintillating means should have a low probability of interaction with neutrons and gamma-rays. Anthracene, for example, is suitable for use as the phosphor material.

To obtain maximum efficiency, the scintillator should be located so that neutrons enter parallel to the scintillating means. If, however, the counting rates are high, such positioning is not necessary. Also, it is to be understood that although the scintillating means have been shown in linear and cylindrical configuration, any desirable type configuration may be employed.

Having fully described the nature, objects, elements and operation of my invention, I claim:

1. A helium 3 scintillation neutron detector adaptable for use in well logging comprising two spaced apart photomultipliers, each adapted to translate light rays into electrical pulses; a plurality of spaced apart scintillating means arranged between said photomultipliers adapted to generate light rays upon interaction with charged particles; the space between said scintillating means containing helium 3 gas, said gas producing upon reaction with neutrons an elastic scatter reaction product comprising one charged particle, the recoiling nucleus helium 3 and an (n, p) reaction product comprising two charged particles, the triton $H^3$ and a secondary particle, the proton; the surface of each of said scintillating means being selectively coated with a reflecting substance opaque to light such that said scintillating means are optically isolated from each other and adjacent scintillating means are optically coupled to different photomultipliers; said photomultipliers being arranged for coincident counting whereby ionizations resulting from (n, p) reactions are distinguished from elastic scatter reactions by simultaneously detecting tritons in one scintillating means and protons in an adjacent scintillating means in order to obtain good neutron spectra.

2. Apparatus as recited in claim 1 wherein each of said scintillating means has a wafer-type configuration.

3. Apparatus as recited in claim 1 wherein each of said scintillating means has a cylindrical configuration.

References Cited in the file of this patent

UNITED STATES PATENTS

| | | |
|---|---|---|
| 2,211,668 | Penning | Aug. 13, 1940 |
| 2,495,650 | Blair et al. | Jan. 24, 1950 |
| 2,596,080 | Raper et al. | May 6, 1952 |
| 2,733,355 | McKee | Jan. 31, 1956 |
| 2,740,898 | Youmans | Apr. 3, 1956 |
| 2,830,184 | Scherbatskoy | Apr. 8, 1958 |
| 2,857,522 | Jones | Oct. 21, 1958 |
| 2,879,398 | Garrison | Mar. 24, 1959 |
| 2,907,881 | Roucayrol et al. | Oct. 6, 1959 |
| 2,920,204 | Youmans | Jan. 5, 1960 |

OTHER REFERENCES

Albert: Review of Scientific Instruments, vol. 24, No. 12, December 1953, pp. 1096–1101.

Batchelor et al.: Review of Scientific Instruments, vol. 26, No. 11, November 1955, pp. 1037-1047.